Patented Apr. 27, 1948

2,440,286

UNITED STATES PATENT OFFICE 2,440,286

INTERPOLYMERIZATION OF ISOAMYLENES WITH NORMAL BUTENES AND ISOBUTENE

Sumner H. McAllister, Lafayette, Calif., assignor to Shell Development Company, San Francisco, Calif., a corporation of Delaware No Drawing. Application October 16, 1944, Serial No. 558,965

6 Claims. (Cl. 260—683.15)

1

This invention relates to the manufacture of liquid hydrocarbons of special value in motor fuels by polymerization of olefins. It deals particularly with an improved procedure whereby increased yields of saturated products of higher quality may be obtained in an efficient and economical manner.

Many different methods of carrying out olefin polymerizations have been suggested and several processes have been applied successfully on a commercial scale, particularly in the conversion of normally gaseous olefins to branched chain paraffins boiling in the gasoline range. The first such commercially successful process was the so called "cold acid" process in which tertiary olefins such as isobutylene were selectively absorbed in a suitable olefin polymerization catalyst and the absorption product then heated to produce copolymers of the absorbed olefin, particularly dimers such as di-isobutylene which were then hydrogenated to form iso-octane. The "hot acid" process wherein mixtures of olefins, especially selected fractions of petroleum cracking products such as butane-butylene fractions, are treated, as for example with sulfuric acid at a temperature at which interpolymerization of the tertiary olefins with other olefins, particularly the corresponding normal olefins, takes place, has been even more widely used. Olefin mixtures of wider boiling range have also been polymerized non-selectively by contact with suitable polymerization catalysts, for example, phosphoric acid on a support, to produce polymers of a highly heterogeneous composition which on hydrogenation yield polymer gasolines. The quality of the polymer gasolines produced by such non-selective polymerization methods is much inferior to that obtainable by the selective "cold acid" polymerization process but the latter has the disadvantage that the yields are restricted by the tertiary olefin content of the starting material. The "hot acid" process was a marked improvement whereby the yield of high quality products was substantially increased. The present invention is a further improvement on such methods of operation. It combines advantageous features of both the cold and hot acid polymerization methods and makes possible substantially higher yields of high quality products than have heretofore been possible.

For the purpose of making the invention clear, it will be described with more particular reference to the production of aviation gasoline blending components from C₄ and C₅ fractions of petroleum cracking products using sulfuric acid

2 as the catalyst in the process. It will be understood, however, that this application of the process is intended to be illustrative only and that the invention may be applied to the production of higher boiling products, particularly higher boiling paraffins which are advantageous as components of safety fuels and for other purposes, by the use of higher boiling fractions in place of either the C₄ or the C₅ fraction or both. Also other suitable catalysts capable of absorbing olefins, for example, phosphoric, phosporous or arsenic acid solutions, or acidic salts such as aluminum chloride, etc., particularly in the form of solutions or suspensions or as complexes with organic compounds, may be used instead of sulfuric acid solutions.

According to this embodiment of the invention, hydrocarbon cracking products, or other suitable starting materials containing similar olefins, are fractionated to separate a fraction comprising olefins having four carbon atoms per molecule, particularly iso- and normal butylenes and the corresponding butanes, from a higher boiling fraction such as a pentane-amylene fraction which may also contain higher boiling hydrocarbons. One of these fractions, preferably the higher boiling fraction, is contacted with an aqueous sulfuric acid solution under conditions at which iso-olefins are selectively extracted therefrom while olefin polymerization is substantially avoided. Thus, for example, the pentane-amylene fraction may be treated to absorb trimethyl ethylene, isopropyl ethylene and unsymmetrical methyl ethyl ethylene. The absorption product is separated from the substantially unabsorbed normal amylenes and pentanes present and is contacted with the other of the starting fractions, for example the butane-butylene fraction, under conditions at which interpolymerization of the absorbed iso-amylene with isobutylene in the butane-butylene fraction and simultaneous interpolymerization of the free normal butylene and isobutylene takes place while interpolymerization of the absorbed iso-amylene with normal butylenes and copolymerization of like olefins of any kind is kept at a minimum. The polymers produced may then be fractionated to separate any undesired components from the product and the latter may be hydrogenated to obtain superior blending agents for motor fuel, particularly aviation gasoline use.

This method of operation differs radically from prior methods of producing polymers from hydrocarbon fractions by interpolymerization of dissimilar olefins contained therein, for in such methods of operation it has always been considered essential to maintain a substantial excess of the less reactive normal olefin over the iso-olefins present throughout the polymerization. Usually three to six mols of normal olefin per mol of iso-olefin are used to insure the desired interpolymerization. In the process of the invention on the other hand, the proportion of iso-olefin in the reaction mixture is made greater than that present in the hydrocarbon fraction undergoing treatment due to the use therewith of iso-olefins selectively removed from another fraction having a different average molecular weight. This new method of operation, as previously indicated, results in products which by hydrogenation yield gasoline blending agents which are markedly superior, particularly for use as aviation motor fuel under rich mixture conditions of operation, to the products heretofore available.

The selective absorption step of the process may be carried out in a variety of different ways and the particular combination of operating conditions which will be most desirable will depend upon the hydrocarbon fraction chosen for treatment and the polymerization agent selected as solvent for the iso-olefin present therein. For the treatment of a $C_4$ or $C_5$ fraction derived from thermal or catalytic cracking or dehydrogenation of hydrocarbons, sulfuric acid solutions of about 60% to 80% concentration are advantageous and the absorption in such cases may be carried out at temperatures between about $-10°$ C. and $+20°$ C. without excessive polymerization, preferably using the more concentrated acid at the lower temperature and vice versa. The hydrocarbon is preferably maintained in the liquid phase although, particularly with butane-butylene fractions, it may be advantageous in some circumstances to operate with the hydrocarbons in the gaseous state. The time of contact of acid and hydrocarbon should be sufficient to insure efficient absorption of the iso-olefin or olefins present with minimum removal of the corresponding normal olefins and will vary with the degree of mixing which in turn is influenced by the type of contacting apparatus chosen. It is preferred to employ sufficient acid solution so that an absorption product containing between about 0.1 and 0.6, preferably about 0.2 to 0.5 mol of olefin per mol of acid is obtained although absorption products containing larger proportions of olefin may be employed at some sacrifice in the quality or yield of final product as a result of the increased tendency of the absorbed iso-olefin to undergo copolymerization in the later polymerization step of the process. With phosphoric acid as the catalyst and absorption agent it is feasible to use higher temperatures and/or acid solutions of higher concentration for the iso-olefin absorption. Thus aqueous phosphoric acid of 60% to 90% concentration may be used at temperatures between about 0° C. and 40° C. if desired.

The residual hydrocarbons remaining after separation of the iso-olefin absorption product may be further treated with acid to effect interpolymerization of unabsorbed iso-olefins, if any, with normal olefins in the conventional manner to augment the yield of total polymers, or the residual olefinic hydrocarbons may be employed as feed to an alkylation process in which they may be reacted with an isoparaffin such as isobutane to produce other aviation blending components or may be otherwise disposed of.

The absorption product of iso-olefin, preferably iso-amylenes in sulfuric acid where $C_4$ and $C_5$ fractions are being employed as the starting fraction, is contacted with the other starting olefinic fraction in the liquid phase using a volume ratio of acid phase to hydrocarbon phase of about 0.5:1 to about 1.2:1 and preferably maintaining a ratio of total iso-olefins to normal olefins of about 0.8:1 to about 1.4:1 and a ratio of the higher boiling iso-olefin to the lower boiling iso-olefin of about 0.2:1 to about 1:1. The optimum temperature for the desired interpolymerization will depend upon the nature and concentration of the acid used in the absorption step of the process. With sulfuric acid of about 60% to 80% initial concentration, temperatures between about 60° C. and 110° C. may be used, employing the higher temperatures with acid of lower initial concentration and vice versa. With phosphoric acid as catalyst, more drastic conditions may be used. U. S. patent 2,332,527 describes and claims an apparatus which is particularly suitable for carrying out the interpolymerization according to the present invention, but other methods of operation providing adequate intimate contact between the acid absorption product and the olefinic hydrocarbon fraction to be reacted therewith may also be employed. Whatever the polymerization method used, it is desirable to control the polymerization so as to favor the formation of dimers, i. e., products of combination of one mol of the starting olefin with another mol of olefin, preferably a different olefin as previously indicated instead of higher boiling products. Contact times of the order of about 10 to 40 minutes are generally suitable.

The reacted emulsion of hydrocarbon and acid containing the products of polymerization may be separated in any convenient manner to recover an acid phase which may contain more or less unreacted iso-olefin absorbed therein and which may be recycled to the absorption stage of the process after addition of any fresh acid needed to make up for losses in the process. The hydrocarbon phase of the reaction mixture is fractionated, preferably after suitable treatment with caustic soda or other base and water washing to remove corrosive components, to separate the polymerization products from unreacted lower boiling hydrocarbons. The latter, which mainly comprise normal olefins and paraffins, may be treated in any of the ways previously pointed out as suitable for the disposal of the residual hydrocarbons from the absorption step of the process, but most preferably are employed as alkylation feed stocks. Particularly where sulfuric acid alkylation treatment is employed, the spent catalyst from such treatment may be used as absorption agent and catalyst in the present process with consequent economy of reagents.

When using $C_4$ and $C_5$ hydrocarbon fractions as starting materials for the process, the polymerization products obtained under the preferred operating conditions will be substantially isooctylenes mainly resulting from interpolymerization of isobutylene and normal butylenes, isononylenes, principally from interpolymerization of isobutylene and iso-amylenes and decylenes formed by copolymerization of iso-amylenes together with a small amount of higher boiling polymers. After removal of the higher boiling products, the polymers of eight to ten carbon atoms per molecule may be hydrogenated to produce a highly advantageous blending agent for aviation gasoline use, or the mixture may be further fractionated and one or more of the components separated and hydrogenated.

Any suitable method of hydrogenation may be employed and the reaction may be carried out with the polymers in either the liquid or the vapor phase. When catalysts such as reduced nickel are employed, it may be desirable to pretreat the polymer to remove sulfur compounds and other catalysts poisons present therein. By the use of catalysts such as tungsten sulfide, molybdenum sulfide or oxide and the like, which are resistant to poisoning, such pretreatment may be avoided. With nickel catalysts on supports, for example, the polymers may be advantageously hydrogenated in the vapor phase using a temperature of about 150° C. to 300° C., a liquid hourly space velocity of between about 0.5 and 10 with a molar ratio of hydrogen to polymer of about 2:1 to 10:1. Other conditions should of course be used with other catalysts but in any case substantial saturation is effected without appreciable decomposition or depolymerization.

The following examples are illustrative of some of the results which may be obtained by the new method and show the advantages of the process.

Example I

An absorption product of iso-amylenes in 70% sulfuric acid, containing about 0.16 mol of absorbed olefin per mol of sulfuric acid was contacted in a high speed mixer provided with a directly connected settling vessel with a butane-butylene fraction of Dubbs' cracking products having the following approximate composition:

|  | Per cent |
|---|---|
| Isobutylene | 18 |
| N-butylenes | 28 |
| Isobutane | 15 |
| N-butanes | 39 |

The reaction mixture was maintained under sufficient pressure to insure that substantially all the hydrocarbons were in the liquid phase at the operating temperature and a ratio of acid phase to hydrocarbon phase of 0.8 to 1 was maintained throughout the reaction which was carried out with equal molecular amounts of isobutylene and absorbed iso-amylene present in the mixture. The molar ratio of iso-olefins to normal olefins in the reaction mixture was 1.3:1.

Separate runs were made at 70° C., 80° C., and 90° C., and it was found that in this range temperature had very little effect on the distribution of the polymers which contained 45% iso-octylenes, 36% isononylenes, 12% isodecylenes and 7% higher boiling products. A slight increase in conversion was obtained at the higher temperatures, however. The polymers were fractionated and hydrogenated to obtain isoparaffin fractions of 8, 9, and 10 carbon atoms per molecule which, in the case of the run made at 70° C. gave the following results when tested in a one cylinder test engine as a 30% blend in a fuel containing 83% S and 17% M and having an F-3 rating equal to isooctane +0.26 cc. TEL when containing 4.0 cc. TEL per gallon:

|  | CRC F-3-443 (lean mixture anti-knock quality) | | CRC F-4-443 (rich mixture anti-knock quality) | |
|---|---|---|---|---|
|  | Blend TEL in isooctane, cc. per gallon | Blending Octane No. of test fraction | Blend TEL in 5.3 cc. per gallon | Index No. of test fraction |
| Octanes (boiling 95° C.-120° C.) | 0.40 | 106.5 | 1.15 | 185 |
| Nonanes (boiling 120° C.-145° C.) | 0.26 | 103 | 1.25 | 195 |
| Decanes (boiling 145° C.-175° C.) | 0.20 | 101.5 | 1.20 | 190 |

Example II

In the same apparatus as used in Example I, the same butane-butylene fraction was reacted with mixtures of iso-amylene in sulfuric acid of 70% initial concentration in various proportions so as to give different ratios of iso-olefins to normal olefins in the reaction mixture. A polymerization temperature of 90° C. and an average time of reaction of about 10 minutes was used in each case. The following table shows the different proportions of olefins used and the distribution and yield of polymer obtained:

| Mol ratio of iso-olefin to normal olefin | Mol ratio of iso-amylene to isobutylene | Composition of Polymer | | | Yield based on— | | | |
|---|---|---|---|---|---|---|---|---|
|  |  |  |  |  | isobutylene | | iso-amylene | |
|  |  | $C_8$ | $C_9$ | $C_{10}$ | $C_8$ | $C_9$ | $C_9$ | $C_{10}$ |
|  |  | Per cent | Per cent | Per cent | Per cent | Per cent | Per cent | Per cent |
| 0.81:1 | 0.244:1 | 71 | 17 | 3 | 147 | 35 | 113 | 19 |
| 1.01:1 | 0.548:1 | 58 | 28 | 7 | 155 | 75 | 108 | 26 |
| 1.21:1 | 0.86:1 | 48 | 35 | 12 | 122 | 88 | 80 | 28 |
| 1.91:1 | 1.94:1 | 30 | 39 | 22 | 125 | 161 | 67 | 38 |

The hydrogenated products from these runs when tested as in Example I gave the following results:

| Mol ratio of iso-olefin to normal olefin | F-3 Ratings Blending Octane Number | | | F-4 Ratings Index Number | | |
|---|---|---|---|---|---|---|
|  | $C_8$ | $C_9$ | $C_{10}$ | $C_8$ | $C_9$ | $C_{10}$ |
| 1.81:1 | 107.5 | 100.5 | ---- | 185 | 165 | ---- |
| 1.01:1 | 109 | 102.5 | ---- | 195 | 175 | ---- |
| 1.21:1 | 107.5 | 102.5 | 101 | 195 | 175 | 160 |
| 1.91:1 | 107.5 | 102.5 | 101.5 | 180 | 175 | 160 |

It will thus been seen that the invention offers many advantages, particularly with respect to the rich mixture anti-knock rating of the products which may be obtained, over prior methods of operation. Thus previous methods in which copolymerization of isobutylene is encouraged, result in the production of isooctane having a rich mixture index number when tested as in the previous examples of only 140 to 150, whereas the present process gives octane fractions having index numbers as high as 195 representing an increase in power output under such conditions of operation of 39% to 30%. Similarly prior methods involving interpolymerization of normal butylenes and/or normal amylenes with iso-amylenes and/or isobutylene, respectively, give polymers which on hydrogenation yield paraffins of substantially lower rich mixture anti-knock quality, i. e. having index numbers of the order of 160, compared with the iso-nonanes produced in the present process which have F-4 index numbers of 195 in the above examples and which have been as high as 215 in other cases. Furthermore, the iso-decane products of the new method have, under the preferred conditions of operation, a rich mixture index number of 195 instead of values 110 to 140 as obtained when methods involving polymerization of normal amylenes are used to produce paraffins of ten carbon atoms per molecule. These differences in power output from the C9 and C10 fractions of product are an important aid in blending improved aviation gasolines, particularly for fighter planes which have frequent need for operation under rich mixture conditions. Similar advantages may be obtained when the process of the invention is carried out with higher boiling fractions for the production of higher boiling paraffins of good anti-knock quality under both lean and rich mixture conditions useful as components of safety fuels of low flash point. Further advantages of the process are its efficiency and economy of operation since substantially complete conversion of the absorbed iso-olefin is achieved by recycling of the acid phase from the polymerization in part to the polymerization and in part to the absorption stage and since the consumption of catalyst in the process is very low.

The process is capable of wide variation not only with respect to the starting fractions which may be used and the operating conditions which may be employed, but also in regard to the method of carrying out the different stages of the process. Thus while continuous methods of operation have been emphasized because of their general economy it is also feasible to carry out one or more of the different operations batchwise or intermittently. Still other variations may be made in the new process which is not restricted to the details disclosed by way of illustration nor is the invention limited by any theory proposed in explanation of the improved results obtained.

I claim as my invention:

1. A process for producing paraffins of high anti-knock quality from hydrocarbon fractions containing iso- and normal olefins having four and five carbon atoms per molecule which comprises contacting the hydrocarbon fraction of five carbon atoms per molecule with sulfuric acid of 60% to 80% concentration under conditions at which iso-amylenes present therein are selectively absorbed by the acid without substantial polymerization to form an absorption product containing 0.2 to 0.8 mol of said iso-amylenes per mol of sulfuric acid, separating the absorption product from the unabsorbed hydrocarbons, contacting the former with the hydrocarbon fraction containing four carbon atoms per molecule in such proportions as to form a mixture containing 0.8 to 1.4 mols of iso-olefin per mol of normal olefin and between about 0.2:1 and 1:1 mols of iso-amylenes to isobutylene, maintaining the mixture in intimate contact at about 60° C. to 110° C. until substantial interpolymerization of absorbed iso-amylene with said isobutylene and of isobutylene with normal butylenes takes place, separating and hydrogenating polymerization products and returning at least a part of the acid to the iso-amylene absorption step.

2. A process of producing paraffins which comprises contacting an absorption product of iso-amylene in sulfuric acid of 60% to 80% concentration containing 0.2 to 0.8 mol of iso-amylene per mol of sulfuric acid with a hydrocarbon mixture comprising isobutylene and normal butylenes in such proportions as to form a mixture containing 0.8 to 1.4 mols of iso-olefin per mol of normal olefin and between about 0.2:1 and 1:1 mols of isoamylenes to isobutylene, maintaining the mixture in intimate contact at about 60° C. to 110° C. until substantial polymerization takes place, separating and hydrogenating polymerization products and returning at least a part of the acid to the iso-amylene absorption step.

3. A process of producing paraffins which comprises treating a pentaneamylene fraction containing iso- and normal amylenes with sulfuric acid to selectively absorb iso-amylenes therefrom to form an absorption product containing 0.2 to 0.8 mol of absorbed iso-amylenes per mol of acid, contacting the absorption product with a butane-butylene fraction containing isobutylene and normal butylene in such proportions as to form a mixture containing 0.8 to 1.4 mols of iso-olefin per mol of normal olefin and between about 0.2:1 and 1:1 mols of iso-amylenes to isobutylene, maintaining the mixture in intimate contact at about 60° C. to 110° C. until substantial polymerization takes place, separating and hydrogenating polymerization products and returning at least a part of the acid to the iso-amylene absorption step.

4. A process of producing paraffins which comprises contacting an absorption product of iso-amylene in sulfuric acid of 60% to 80% concentration containing 0.2 to 0.8 mol of absorbed iso-amylene per mol of acid with a hydrocarbon mixture comprising isobutylene and normal butylenes under polymerization conditions in such proportions as to form a mixture containing 0.8 to 1.4 mols of iso-olefin per mol of normal olefin and a mol ratio of iso-amylene is isobutylene between about 0.2:1 and 1:1 whereby substantial interpolymerization of the iso-olefins takes place but polymerization of iso-amylene with normal butylene is substantially avoided, separating and hydrogenating polymerization products and returning at least a part of the acid to the iso-amylene absorption step.

5. A process of producing higher boiling hydrocarbons which comprises treating a pentane-amylene fraction containing iso- and normal amylenes with a polymerization catalyst in the liquid phase to selectively absorb iso-amylenes therefrom to form an absorption product containing 0.2 to 0.8 mol of absorbed iso-amylenes per mol of acid, contacting the absorption product with a butane-butylene fraction containing isobutylene and normal butylene in such proportions as to form a mixture containing 0.8 to 1.4 mols of iso-olefin per mol of normal olefin and between about 0.2:1 and 1:1 mols of iso-amylenes to isobutylene, maintaining the mixture in intimate contact at about 60° C. to 110° C. until substantial polymerization takes place.

6. A process of producing higher boiling hydrocarbons which comprises contacting an absorption product of an iso-amylene in a liquid olefin polymerization catalyst containing 0.2 to 0.3 mol of absorbed olefin per mol of said catalyst with a hydrocarbon mixture comprising isobutylene and normal butylenes in such proportions as to form a mixture containing 0.8 to 1.4 mols of iso-olefin per mol of normal olefin and a mol ratio of absorbed iso-amylene to iso-butylene of between about 0.2:1 and 1:1, maintaining the mixture under polymerization conditions and recovering polymer therefrom.

SUMNER H. McALLISTER.

REFERENCES CITED

The following references are of record in the file of this patent:

UNITED STATES PATENTS

| Number | Name | Date |
|---|---|---|
| 1,889,952 | Mueller-Cunradi | Dec. 6, 1932 |
| 2,007,159 | Engs | July 9, 1935 |
| 2,181,640 | Deanesly | Nov. 28, 1939 |
| 2,181,942 | Ipatieff | Dec. 5, 1939 |
| 2,199,133 | Marschner | Apr. 30, 1940 |
| 2,300,818 | Sweeney | Nov. 3, 1942 |

OTHER REFERENCES

Whitmore et al., article in Jour. Amer. Chem. Soc.; vol. 63, May 1941; pages 1460–1462.